June 21, 1960 R. SIEGEMUND 2,941,740
REWINDING CASSETTE FOR TAPES, FILAMENTS OR WIRES
Filed Sept. 2, 1954
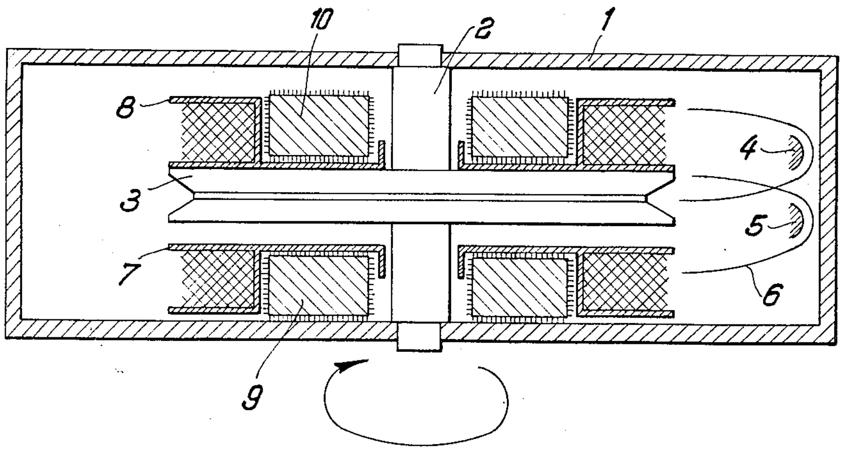
Inventor:
RICHARD SIEGEMUND
BY [signature]
ATTORNEY United States Patent Office 2,941,740
Patented June 21, 1960

2,941,740

REWINDING CASSETTE FOR TAPES, FILAMENTS OR WIRES

Richard Siegemund, Luisenstrasse 38, St. Georgen, Black Forest, Germany

Filed Sept. 2, 1954, Ser. No. 453,901
Claims priority, application Germany Sept. 7, 1953
9 Claims. (Cl. 242—55.13)

The invention relates to a rewinding cassette for tapes, filaments or wires having built-in take-up and supply reels, which are disposed concentrically in relation to a driving shaft. Such cassettes are used for example in sound recording on a medium taking the form of a tape or wire, and are so arranged that the tape or wire can be rewound in both directions. The tape, filament or wire is protected against external influence by the incorporation of the rewinding system in a cassette. This is especially desirable in the case of magnetic sound recording and reproduction with the aid of very fine wires, and to some extent is even an indispensable requirement for preventing damage to the wire, or abrasion or kinking. It is consequently also desirable to dispose all guiding and direction-changing members for the wire within the closed cassette.

The invention has for its object the improvement of cassettes of the kind referred to, in respect of the transmission of the drive, and simultaneously to make possible a simplified construction of the cassette.

The characteristic feature of the invention resides in that the take-up and supply reels disposed concentrically to the driving shaft are capable of limited axial movement, and are arranged on opposite sides of a driving and guiding disc rotating with the shaft and transmitting the drive, and that an additional weight capable of limited axial movement is provided for each rewinding reel, said weight being disposed between the wall of the cassette and the reel associated therewith, and that the latter is only loaded when placed on the driving and guiding disc. In this arrangement the reel disposed on the driving and guiding disc at any given time serves as the take-up reel. Since this reel is only driven by friction, a slipping movement is possible, to compensate for the increase in winding diameter which takes place during the take-up process. The driving and guiding disc which transmits the drive ensures uniform speed of the tape being wound. The winding reel in the lower position at any given time serves as the supply reel and is in contact with the lower wall of the cassette, thus undergoing the braking necessary for the trouble-free-rewinding.

The importance of the proposed further measure of providing an additional weight in association with each winding reel resides in that it is possible with the help of these additional weights substantially to compensate for the changes in reel weight consequent upon the constantly changing state of winding. Such weight compensation would be practically unnecessary if the weight or mass of the reels were made so great from the start that changes in weight during supply and take-up could be neglected. Heavy weight of the delivery reel at any given time can lead to considerable trouble when the winding process is started and stopped. At starting, the accelerating forces depend on the weight. At stopping, there is the danger that the delivery reel will continue to run because of its high inertia, and lead to entanglement of the wire. On the contrary, it is desirable for the take-up reel at any given time to have a greater mass, i.e. greater weight, so that the influence of the change in weight during the take-up process can be neglected, and the working conditions remain substantially the same. The invention conforms to these fundamental conditions by the use of additional weights, while only the additional weight for the take-up reel comes into operation at any given time.

The reels themselves can therefore be made as light as desired without regard to the weight of the quantity of tape or wire to be taken up, so that the aforesaid loading of the wire or tape and the aforesaid possibilities of difficulties arising in the guiding of the wire are fundamentally obviated.

In accordance with a further development of the invention, it is proposed to provide each winding reel with an annular depression between the hub and the reel space to receive the appropriate additional weight. In this case the additional weight will expediently also be of annular form.

It is finally recommended in accordance with the invention to provide the additional weights with a sound-damping anti-friction covering, expediently over their whole surface, said covering overcoming change-over and running noises, and simultaneously acting as a brake lining for the supply reel disposed in the lower position at any given time. A velvet coating has proved expedient as a friction covering, which is preferably so formed by electrostatical means that the individual fibres are perpendicular to the surface to which the layer is applied.

A constructional form of the subject of the invention is illustrated in the drawing.

A vertical shaft 2 is mounted in a cassette 1, which expediently consists of an upper part and a lower part, said shaft integrally bearing a disc 3. Two reversing members 4 and 5 for a wire 6 are also contained in the cassette, said wire being led from the supply reel 7, which occupies the lower position at any given time to the take-up reel 8, which occupies the upper position at any given time. The wire is guided in such a way that it runs from the reel 7 via the guiding member 5 to the disc 3, and from the disc 3 via the guiding member 4 to the take-up reel 8. Additional weights 9 and 10 are provided for the reels 7 and 8 respectively. The two reels and the two additional weights are capable of free axial movement between the base and cover of the cassette and the driving and guiding disc 3. Consequently, in the position illustrated, the additional weight 9 is in contact with the inner side of the base of the cassette, while the reel 7 lies on the weight 9. In contrast thereto, the reel 8 lies on the disc 3, and is loaded by its additional weight 10. The friction acting on the drive of the reel 8 is amplified by the additional weight. The alteration in the weight of the wire taken up by the reel 8 therefore has practically no effect on the drive of the reel 8.

The reel 7 is not loaded by its additional weight 9. The accelerating force arising at the start of the winding process will consequently be relatively small. In addition the inertia of the supply reel 7 is low, so that further slipping of the reel 7 during stopping need not be feared.

As may be seen from the drawing, the reels 7 and 8 have annular recesses, in which the additional weights 9 and 10 are disposed. A very compact construction is thereby made possible. The additional weights are entirely covered with velvet, which prevents disturbing noises from arising, and may be used as a brake lining, as may be seen from the drawing.

What I claim is:

1. A rewinding device for filamentary material, such as tapes, filaments or wires, comprising a driving rotatable vertical shaft, a driving disc integrally supported on the shaft, a pair of reels adapted to carry filamentary material rotatably on the shaft and capable of axial movement, the reels of the pair being of light weight and on opposite sides of the driving disc, means for limiting the axial movement of each reel in the direction away from the disc, and a weight member of a weight greater than each reel loosely about the shaft to the side of each reel remote from the driving disc and adapted to load its reel to press such reel against the disc only when that reel is above the driving disc and to rest on the axial limiting means when such reel is below the disc.

2. A rewinding device according to claim 1 in which each weight member is annular, and the adjacent face of the reel has a radially innermost recess for receiving the annular weight member.

3. A rewinding device according to claim 1 in which each weight member has a layer of noiseless friction increasing material on at least its external surfaces engaging the reel when loading the reel and engaging the stop means when not loading the reel.

4. A rewinding device according to claim 1 in which the shaft, disc, reels and weight members are within an enclosing housing, the shaft ends are supported in a pair of opposite walls of the housing, each wall of such pair constituting the means limiting the axial reel movement outwardly from the disc, the weight members are annular cylinders loosely fitting about the shaft, the face adjacent to the annular weight member of each reel has a recess adapted to receive the weight member, and a layer of friction increasing felt on at least the exterior surfaces of the weight members engaging the reels in the loading position and the walls of the pair in the non-loading position.

5. A rewinding device for filamentary material comprising a housing, a rotatable vertical driving shaft within the housing supported at its ends in the top and bottom walls of the housing, a disk integral with an intermediate region of the shaft, a reel for filamentary material rotatably on the shaft to each side of the disk and freely slidable axially on the shaft, the disk and each reel having clearance relative to the housing and each reel being of light weight and having an axial height less than the distance from the disk to the top and bottom housing walls, an annular member of a weight in excess of that of the reel loosely about the shaft to the side of each reel remote from the disk, and an annular recess in the side of each reel remote from the disk and adapted to receive its adjacent weight member, the recess being of a depth less than the axial height of the weight member, whereby in each the upright and the reversed vertical positions of the shaft the lower one of the weight members rests on the then lower of the housing bottom and top walls, the lower one of the reels being axially supported on the lower weight member, while the upper one of the weight members presses the upper one of the reels into intimate contact with the disk.

6. A reversible rewinding device for filamentary material comprising a housing, a vertical drive shaft within the housing and supported at its ends in the top and bottom walls of the housing, a disc integral with the shaft substantially midway the shaft ends, a pair of light-weight reels for filamentary material rotatably about the shaft with one reel thereof above and the other below the disc and freely slidable on the shaft between the disc and the respective shaft supporting housing wall, and a member of appreciable mass about the shaft and axially displaceable between each reel and the nearer of the shaft supporting housing walls for loading its associated reel to engage such associated reel intimately with the disc only when such associated reel is above the disc.

7. A reversible rewinding device according to claim 6 in which the surface of each reel remote from the disc defines an annular recess in the hub region of the reel and is adapted to receive the member of appreciable mass of annular form therein when the particular reel is above the disc.

8. A reversible rewinding device according to claim 6 in which the member of appreciable mass is annular and has all its surfaces covered with a noiseless friction increasing material, and the surface of each reel remote from the disc defines an annular recess in the hub region of the reel adapted to receive the annular, appreciable mass member therein when the reel is above the disc.

9. A rewinding device for filamentary material comprising a driving, rotatable vertical shaft, a driving disc integrally on the shaft, a pair of reels adapted to carry filamentary material rotatably on the shaft and capable of axial movement, the reels of the pair being on opposite sides of the driving disc, means for limiting the axial movement of each reel in the direction away from the disc, and a pair of weight members loosely about the shaft of which a respective one is to the side of each reel remote from the driving disc and loading its associated reel to press such reel against the disc only when that reel is above the disc and to rest on the axial limiting means when such reel is below the disc.

References Cited in the file of this patent

UNITED STATES PATENTS

| | | |
|---|---|---|
| 1,499,521 | Hogemann | July 1, 1924 |
| 2,028,608 | Howell | Jan. 21, 1936 |
| 2,576,459 | Holzman | Nov. 27, 1951 |
| 2,598,716 | Nygaard | June 3, 1952 |
| 2,668,021 | Gleason | Feb. 2, 1954 |
| 2,782,999 | Rohling et al. | Feb. 26, 1957 |

FOREIGN PATENTS

| | | |
|---|---|---|
| 747,787 | Great Britain | Apr. 11, 1956 |